United States Patent [19]
Warneke et al.

[11] Patent Number: 6,043,727
[45] Date of Patent: Mar. 28, 2000

[54] RECONFIGURABLE MILLIMETERWAVE FILTER USING STUBS AND STUB EXTENSIONS SELECTIVELY COUPLED USING VOLTAGE ACTUATED MICRO-ELECTRO-MECHANICAL SWITCHES

[75] Inventors: Brett Warneke, Berkeley; Juan Lam, Agoura Hills; Adele Schmitz, Newbury Park; Julia Brown, Santa Monica; Darren Atkinson, La Habra, all of Calif.; Daniel J. Hyman, Cleveland Hts., Ohio; Robert Y. Loo, Agoura Hills, Calif.

[73] Assignee: Hughes Electronics Corporation, El Segundo, Calif.

[21] Appl. No.: 09/079,804

[22] Filed: May 15, 1998

[51] Int. Cl.$^7$ ........................................................ H01P 7/00
[52] U.S. Cl. ............................................ 333/205; 333/235
[58] Field of Search .................................. 333/204, 205, 333/219, 33, 263, 262, 235, 258

[56] References Cited

U.S. PATENT DOCUMENTS

| | | |
|---|---|---|
| 3,796,976 | 3/1974 | Heng et al. ............................ 333/161 |
| 4,906,956 | 3/1990 | Kakihana ............................ 333/263 X |
| 5,164,688 | 11/1992 | Larson ................................ 333/205 X |
| 5,808,527 | 9/1998 | De Los Santos ....................... 333/205 |

FOREIGN PATENT DOCUMENTS 4-276905  10/1992  Japan ..................................... 333/263

*Primary Examiner*—Seungsook Ham
*Attorney, Agent, or Firm*—Bradley K. Lortz; Michael W. Sales; Viji D. Duraiswamy

[57] ABSTRACT

A reconfigurable filter system designed using micro-elecro-mechanical (MEM) switches is disclosed. The filter comprises a transmission line with one or more filter stubs coupled to the transmission line by MEM switches. The impedance of the filter system is altered by selectively opening and closing the MEM switches, which alters the filter characteristics of the filter system. Alternatively, the characteristics of the filter system are altered by using the MEM switches to selectively alter the length of filter stubs attached to the transmission line.

14 Claims, 3 Drawing Sheets

RECONFIGURABLE MILLIMETERWAVE FILTER USING STUBS AND STUB EXTENSIONS SELECTIVELY COUPLED USING VOLTAGE ACTUATED MICRO-ELECTRO-MECHANICAL SWITCHES

This invention was made with Government support under Contract No. N66001-96-C-8636 awarded by the Department of the Navy. The Government has certain rights in this invention.

BACKGROUND OF THE INVENTION (a) Technical Field of the Invention

This invention relates generally to filters. More specifically, it relates to a reconfigurable filter design that incorporates microelectro-mechanical switches.

(b) Description of Related Art

In signal processing and communication systems, it is often desirable to remove unwanted frequencies from a signal, or isolate and allow desired frequencies to pass. Typically, a separate filter system is required for every district range of frequencies that is desired. For example, low-pass filtering would require one filter system and band-pass filtering would require a second. If it were desired to filter frequencies at a second low-pass cutoff, a second low pass filter system would be required. In millimeterwave circuits, these filters are typically laid out on printed circuit boards using microstrip lines with filter stubs attached to the microstrip lines. The filter stubs present an impedance to the millimeterwave signals passing through the microstrip line. The magnitude and type (inductive or capacitive) of the impedance is varied by altering the physical characteristics of the filter stubs. Through a combination of stubs, a wide variety of filters can be designed.

A separate microstrip filter system is required for each district range of frequencies. If a large variety of filter configurations is desired, the filter assembly would require a large amount of layout area. For millimeterwave circuits on printed circuit boards for applications such as satellite communications, layout space is at a premium.

It is therefore desirous to have a single filter that can be configured to filter many different frequency bands. In the past, YIG spheres and varactor diodes have been used as reconfigurable filters. These filters, however, suffer from a poor insertion loss—that is, there is a significant signal loss across these devices even when the filters are set in an 'all-pass' configuration. In addition, varactor filters are continuously tunable filters and have filter characteristics that are dependant upon the bias of the filter. Thus, fluctuations in the filter biasing will affect the filter characteristics. In addition, varactor filters typically cannot be used above 10 GHz because of the relatively low quality factor or "Q", of the varactor filters.

Accordingly, there is a need for a reconfigurable filter that has a low insertion loss, a large operating bandwidth, and filter characteristics that are not altered by deviations in biasing.

SUMMARY OF THE INVENTION

The present invention is a reconfigurable millimeterwave filter comprised of filter stubs connected to a transmission line by micro-electro-mechanical (MEM) switches. The MEM switches allow the filter stubs to be selectively connected to the transmission line to vary the impedance of the filter system. The MEM switches have a low insertion loss when closed and a high isolation when open. The MEM switches can pass a large bandwidth of signals and are unaffected by minor variations in bias voltages.

In one embodiment of the invention, a reconfigurable antenna comprises a transmission line having an input end and an output end. The transmission line is connected to a filter stub by a MEM switch. The MEM switch is used to selectively couple the filter stub to the transmission line. When the MEM switch is closed, the filter stub is electrically connected to the transmission line, and when the MEM switch is open the filter stub is electrically isolated from the transmission line. The filter will have different filter characteristics between the input end and the output end depending on whether the switch is open or closed. The transmission line and the filter stub may be printed as metal lines on a circuit board. The end of the filter stub may be open circuited or short circuited to ground.

In a second embodiment, a second filter stub is connected to the above-described filter system by a second MEM switch. The second filter stub may be selectively coupled to the transmission line by the second MEM switch such that the second filter stub is electrically connected to the transmission line when the second MEM switch is closed, and is isolated from the transmission line when the second MEM switch is open. Alternatively, the second filter stub may be selectively coupled to the first filter stub such that the second filter stub is electrically connected to the first filter stub when the second MEM switch is closed and is electrically isolated from the first filter stub when the second MEM switch is open.

The present invention may also be embodied in a method of filtering a signal comprising the steps of placing a signal on one end of a transmission line that is selectively coupled to a filter stub through the use of a MEM switch, opening the MEM switch when a first filter configuration is desired, closing the MEM switch when a second filter configuration is desired, and receiving the filtered signal at another end of the transmission line. The transmission line and the filter stub may be printed metal lines on a circuit board substrate, and the signal may fall within the millimeterwave frequencies.

The present invention may also be embodied in a method of filtering a signal with a first step of placing a signal on one end of a transmission line. The transmission line is electrically connected to a first filter stub, and a second filter stub is selectively coupled to the first filter stub by a MEM switch. The method further comprises the steps of opening the MEM switch when a first filter configuration is desired, closing the MEM switch when a second filter configuration is desired, and receiving the filtered signal on another end of the transmission line. The transmission line and the filter stub may be printed metal lines on a circuit board substrate, and the signal may fall within the millimeterwave frequencies.

BRIEF DESCRIPTION OF THE DRAWINGS

These and other features of the present invention will become more apparent when a detailed consideration of the invention is taken in conjunction with the drawings herein.

DETAILED DESCRIPTION OF THE DRAWINGS

Figure 1:
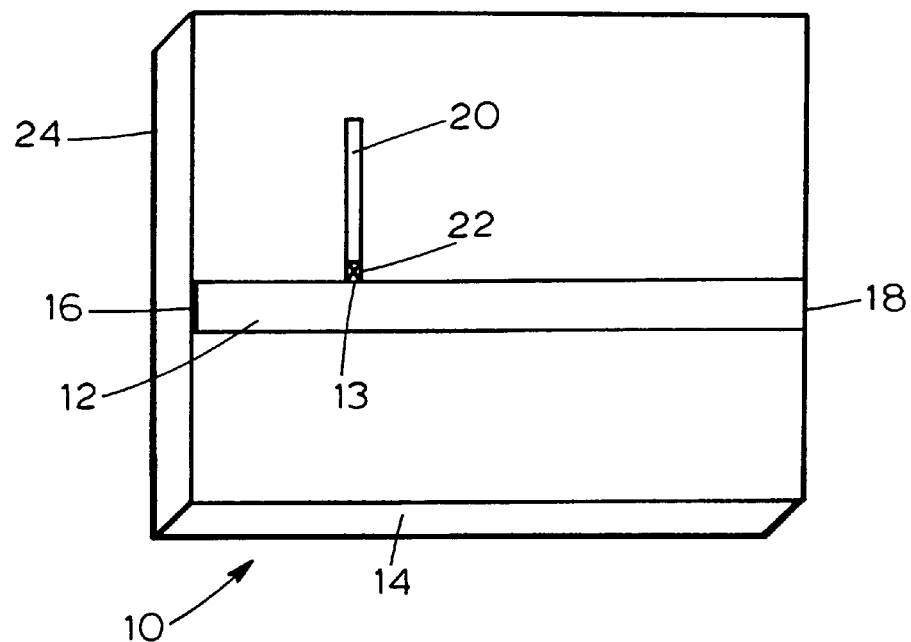
FIG. 1 shows one embodiment of a reconfigurable millimeterwave filter embodying the present invention, wherein a single micro-electro-mechanical switch is provided.

FIG. 1 depicts one embodiment of a reconfigurable filter 10 according to the present invention. A transmission line 12 is printed onto a substrate 14. The transmission line 12 has an input end 16 and an output end 18. Signals pass through the transmission line 12 by entering the transmission line 12 at the input end 16 and exiting at the output end 18. The impedance of the filter 10 is determined in large part by the frequency of the signal passing through the transmission line 12. The filter 10 will thus reduce the magnitude of the signals at some frequencies while allowing other frequency signals to pass relatively unimpeded.

A filter stub 20 is connected to the transmission line 12 at a stub injunction 13 by a micro-electro-mechanical (MEM) switch 22. The MEM switch 22 allows the filter 10 to be configured in different arrangements that will impede different frequency bands. When the MEM switch 22 is opened, the only impedance affecting the signal is the impedance of the transmission line 12. This impedance is determined primarily by the geometry of the transmission line 12 and the frequency of the signal. When the MEM switch 22 is closed, the filter stub 20 is electrically connected to the transmission line 12. The filter stub will then be in parallel with the section of the transmission line 12 that follows. The impedance of the filter stub 20 will be, therefore, in parallel with the impedance of the transmission line 12 that follows that stub junction 13. This will alter the impedance of the filter 10 as seen by a signal entering the input end 16 of the transmission line 12, causing the filter 10 to pass and/or block different frequencies.

When the MEM switch 22 is closed, the filter stub 20 will add a impedance in parallel to the transmission line 12 following the stub junction 13. The filter stub 20 is terminated by an open circuit. This gives the filter stub 20 a impedance of $$Z_s = -j\, Z_o \cot(\beta I) \quad (60)$$

where $\beta = 2\pi/\lambda$, $\lambda$ is the wavelength of the input signal, $Z_o$ is output impedance of filter system 10, and I is the length of the open-circuited stub 20. A ground plane 24 is located on the bottom of the substrate 14. The filter stub 20 may alternatively be terminated with a via 30 (shown in FIG. 2) through the substrate 14 to the ground plane 24. The via 30 will short circuit the end of the filter stub 20, causing the impedance of the stub 20 to be $$Z_s = j\, Z_o \tan(\beta I) \quad (62)$$

The combined impedance of the transmission line 12 and the filter stub 20 can be calculated by methods well-known to those in the art of filter design, such as circuit simulation and equivalent circuit analysis. The transmission line 12 can be broken up into a series of segments at each point where a filter stub is connected to the transmission line 12. The transmission line segments will contribute a series reactance to the impedance of the filter system 10. Whenever a stub junction is reached, the susceptance of the filter stub will be in parallel with the section of the transmission line following the stub junction (which may include impedance contributions from filter stubs located further down the transmission line). The filter 10 of FIG. 1 has two possible configurations depending on the state of the MEM switch. In a first configuration, the MEM switch 22 is open. The impedance of the filter system 10 is thus the series reactance of the entire transmission line 12. In a second configuration, the MEM switch 22 is closed. The impedance of the filter system 10 would then be the reactance of the transmission line segment from the input end 12 to the stub junction 13, plus the parallel combination of the impedance of the filter stub 20 and the reactance of the transmission line 12 from the stub junction 13 to the output end 18.

Figure 2:
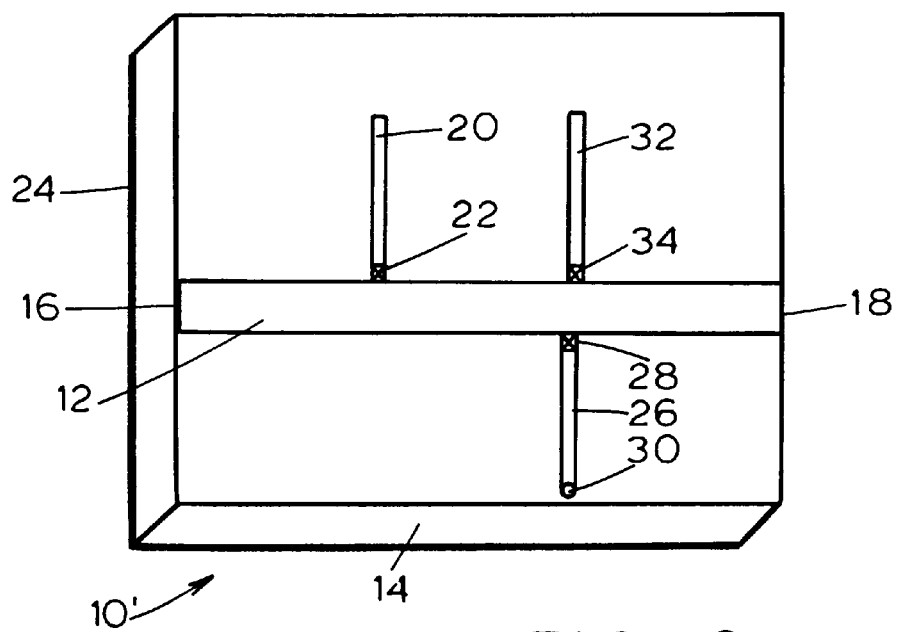
FIG. 2 shows a second embodiment of a reconfigurable millimeterwave filter embodying the present invention, wherein two micro-electro-mechanical switches are provided.

It is possible to add additional stub lengths to the transmission line 12 to give the filter 10 different filter characteristics. FIG. 2 illustrates an alternative filter 10' wherein a second filter stub 26 and a third filter stub 32 are connected to the transmission line 12 by a second MEM switch 28 and a third MEM switch 34. The end of the second stub 26 is short circuited to the ground plane 24 by a via 30. The filter of FIG. 2, can be configured in eight different filter modes. In one mode, the first MEM switch 22, the second MEM switch 28, and the third MEM switch 34 are open and the impedance of the filter is simply the impedance of the transmission line 12. In another configuration, the first MEM switch 22, the second MEM switch 28, and the third MEM switch 34 are closed, connecting the first filter stub 22, the second filter stub 26, and the third filter stub 32 to the transmission line 12. The susceptance of all of the filter stubs would thus have to be factored into the impedance of the filter. The remaining six filter modes may be realized by selectably changing the states of the three MEM switches to selectably connect any of the three filter stubs to the transmission line 12. Additional filter stubs and MEM switches may be added to the transmission line 12 as desired to allow the filter to block other frequency possibilities.

It does not matter which end of the transmission line 12 is the input end 16 and which is the output end 18. Signals may alternatively flow from the output end 18 to the input end 16. Referring once again to FIG. 1, the distance from the output end 18 to the filter stub 20 may be different than the distance from the input end 16 to the filter stub 20. This may cause the effective impedance of the filter 10 to be different when looking at the filter 10 from the output end 18 to the input end 16 rather than from the input enc 16 to the output end 18, as the distance from the point of entry for the signal to the stub junction will be different. While the impedance and hence the characteristics of the filter 10 may be different when a signal passes from the output end 18 to the input end 16, the filter 10 may be designed to have signals pass in either direction so long as this limitation is considered.

The present invention is ideally suited for filtering signals in the millimeterwave frequencies. Millimeterwave filter systems embodying the present invention may be fabricated using printed circuit technology. The transmission line 12 and the filter stub 20 may be printed directly onto a circuit board that will serve as the substrate 14. The MEM switches 22 will typically be fabricated on a semiconductor wafer and die cut and inserted onto the printed circuit board serving as the substrate 14. The ground plane 24 may be fabricated directly to the bottom of the circuit board using conventional printed circuit board manufacturing processes.

Figure 3A:
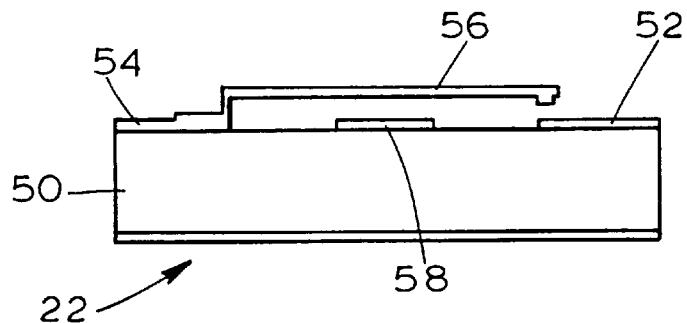
FIG. 3A shows an elevation view of a micro-electro-mechanical switch in the open position.
Figure 3B:
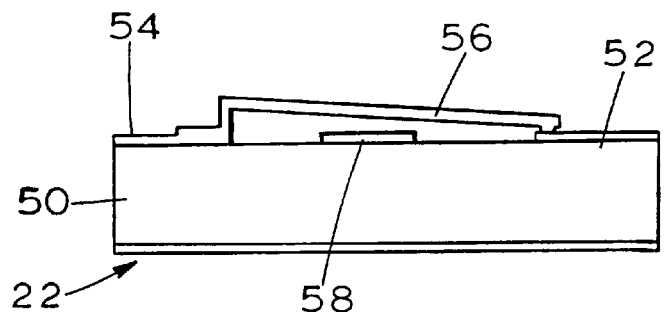
FIG. 3B shows an elevation view of the micro-electro-mechanical switch of FIG. 3A in the closed position.

While it is possible to use other types of switches to connect the filter stub 20 to the transmission line 12, such as a gallium arsenide semiconductor switch, the MEM switch 22 is preferred because it has both a very low insertion loss when closed and high isolation value when open. FIG. 3A is a more detailed view of the MEM switch 22 in the 'open' position. The MEM switch 22 may be fabricated using standard integrated circuit technology. The MEM switch 22 is constructed on a substrate 50. In the preferred embodiment, GaAs is used as the substrate 50. Other materials, such as InP, silicon, or even ceramics may be used as well. On top of the substrate 50 is an input line 52, an output line 54, an armature 56, and an electrode 58. FIG. 3B is a detailed elevational view of the MEM switch 22 in the 'closed' position.

Figure 4:
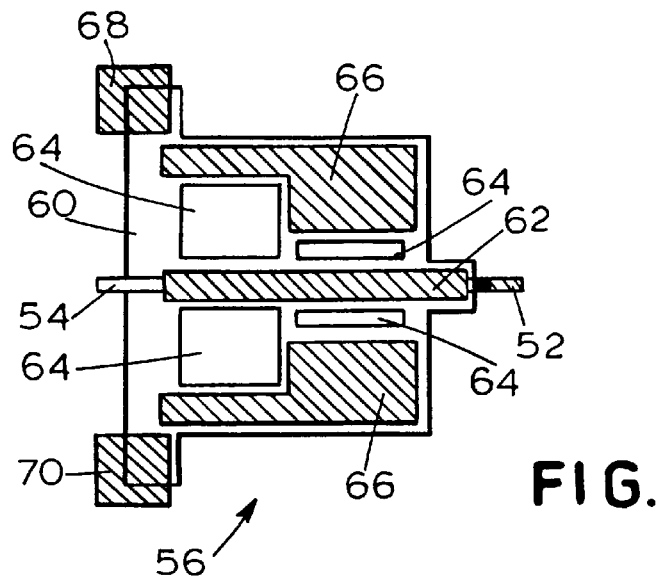
FIG. 4 shows an overview of the MEM switch in FIGS. 3A–3B.

A detailed overview of the armature 56 is shown in FIG. 4. A beam structural layer 60 provides most of the support for the armature 56. Printed underneath the structural layer 60 and extending from one end of the armature 56 to the other is a conducting line 62. One end of the conducting line 62 is electrically connected to the output line 54. The other end of the conducting line 62 rests above the input line 52. When the MEM switch 22 is in the open position, the conducting line 62 is separated and electrically isolated from the input line 52 by an air gap.

An armature electrode 66 is positioned on the side of the conducting line 62. As shown in FIGS. 3A and 3B, a substrate electrode 58 is located below the armature 56. The MEM switch 22 is actuated by creating a voltage difference between the armature electrode 66 and the substrate electrode 58. This creates an 31 electrostatic force that will draw the armature electrode 66, and hence the armature 56, towards the substrate electrode 58. As the armature 56 is drawn towards the substrate electrode 58, it will bend and contact the input line 52. This creates an electrical connection between the input line 52 and the output line 54 through the conducting line 62. This 'closed' switch position is shown in FIG. 3B. Other embodiments of the MEM switch 22 do not use the armature electrode 66. Instead, a DC voltage is applied to the conducting line 62 and an electrostatic force is generated between the conducting line 62 and the substrate electrode 58. The large surface area of the armature electrode 66 reduces the actuation voltage required to close the MEM switch 22. The use of the armature electrode 66 also reduces the RF interference caused by placing a DC signal on the conducting line 62 itself. An armature electrode via 68 and a substrate electrode via 70 are located at the base of the MEM switch 22. These vias are used to set the voltage difference between the armature electrode 66 and the substrate electrode 58. The armature electrode via 68 is electrically connected to the armature electrode 66, and the substrate electrode via 70 is electrically connected to the substrate electrode 58.

The input line 52, output line 54, and conducting line 62 are typically made of metal and may be fabricated using standard integrated (circuit technology such as masking and resist lift-off. Gold is the preferred metal to use because of its low resistivity, but other metals may be used as well. The MEM switch 22 will exhibit a low insertion loss when in the closed position and has a high isolation between the input line 52 and the output line 54 when the switch is open. This allows the filter to have discrete filter characteristics in the different configurations. Without high isolation between the filter stub 20 and the transmission line 12, a designer would have to consider the coupling effects that may occur between the filter stub 20 and the transmission line 12 even when the MEM switch 22 was open. In addition, the MEM switch 22 is capable of conducting a broad range of frequencies with little signal loss. These characteristics make the MEM switch 22 an ideal choice for use in multi-frequency millimeterwave applications.

When placed in the filter system 10 or 10', the MEM switch 22 can be positioned so that either the input line 52 or the output line 54 is in electrical contact with the transmission line 12. The other of the input line 52 or output line 54 will be connected to the filter stub 20. When closed, current will flow equally well from the output line 54 through the conducting line 62 to the input line 52 in the MEM switch 22 as it would if the path was reversed.

Other known MEM switch configurations are suitable for use with the present invention. Examples are disclosed in U.S. Pat. No. 5,121,089, issued on Jun. 9, 1992 to Larry Larson, and "Design and Fabrication of Broadband Surface-Micromachined Micro-Electro-Mechanical Switches for Microwave and Millimeter-Wave Applicatiors," Ser. No. 09/080,326, a co-pending application filed concurrently with the present application. The present invention should not be construed to be limited to the use of a particular MEM switch described herein.

Figure 5:
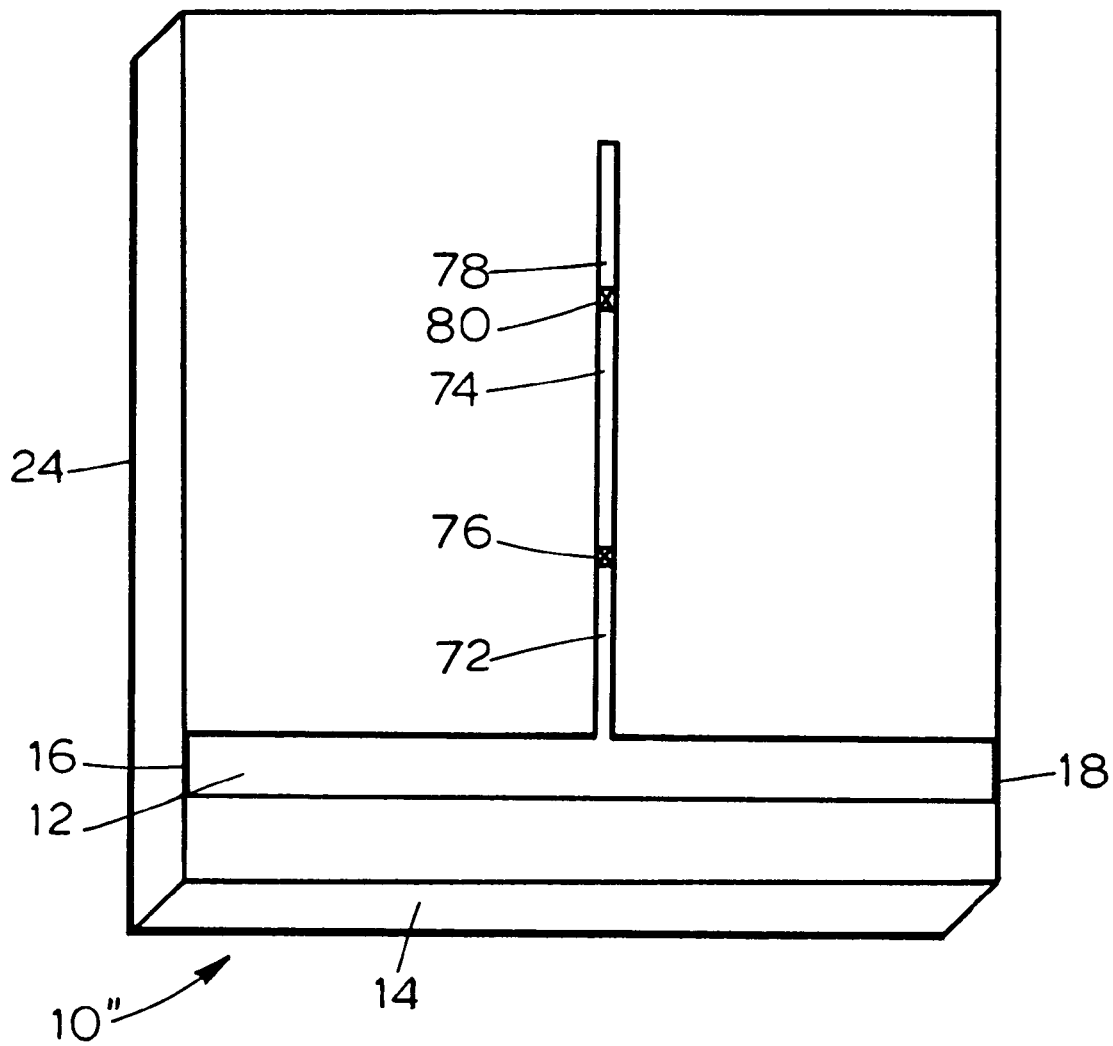
FIG. 5 shows an alternative embodiment of the reconfigurable filter wherein MEM switches are used to alter the length of a filter stub.

FIG. 5 depicts an alternative filter 10". In FIG. 5, a first filter stub 72 is electrically coupled to the transmission line 12. This may or may not be done through the use of a MEM switch. In FIG. 5, the first filter stub 72 is connected directly to the transmission line 12 without a MEM switch. A second filter stub 74 is coupled to the first filter stub 72 with a first MEM switch 76 and a third filter stub 78 is coupled to the second filter stub 74 through a second MEM switch 80. When the MEM switch 76 is open, the equivalent length of the stub section is only the length of the first filter stub 72. When the first MEM switch 76 is closed and the second MEM switch 80 are closed the equivalent height of the stub includes first, second, and third section 72, 74, 78. The second filter stub 74 is electrically isolated from the transmission line 12 by the open first MEM switch 76. When the first MEM switch 76 is closed and the second MEM switch 80 is open, the second filter stub 74 is electrically coupled to the first filter stub 72, resulting in a stub section with a length approximately equal to the length or the first filter stub 72 plus the second filter stub 74. The added stub length changes the susceptance of the stub section which in turn alters the characteristics of the filter. Thus, by selectively adding in additional lengths of stubs, the filter can be configured with varying characteristics.

The present invention is not limited to the embodiments shown in FIGS. 1, 2, and 5. Additional filter stubs may be added to create additional embodiments. These filter stubs may be added directly to the transmission line, as is shown in FIGS. 1 and 2, or to an already connected filter stub, as shown in FIG. 5. Both of these methods may also be combined in a single filter design. For example, a single filter may have a first and a second filter stub connected to the transmission line with two MEM switches, and a third filter stub connected to the first or the second stub by a third MEM switch. It is therefore intended that the foregoing detailed description be regarded as illustrative rather than limiting and that it be understood that it is the following claims, including all equivalents, that are intended to define the scope of this invention.

What is claimed is:

1. A reconfigurable filter comprising:
   a) a transmission line having an input end and an output end;
   b) a first filter stub;
   c) a first micro-electro-mechanical switch connected to the transmission line and the first filter stub to selectively couple the first filter stub to the transmission line such that the first filter stub is electrically connected to the transmission line when the first micro-electromechanical switch is closed and electrically isolated from the transmission line when the micro-electro-mechanical switch is open, wherein the first micro-electro-mechanical switch is opened and closed by a first voltage signal;

d) a second filter stub; and e) a second micro-electro-mechanical switch connected to the second filter stub and the first filter stub for selectively coupling the second filter stub to the first filter stub such that the second filter stub will be electrically connected to the first filter stub when the second micro-electro-mechanical switch is closed and electrically isolated from the first filter stub when the second micro-electro-mechanical switch is open, wherein the second micro-electro-mechanical switch is opened and closed by a second voltage signal.

2. The reconfigurable filter of claim 1, wherein the transmission line, the first and second filter stubs, and the first and second micro-electro-mechanical switches are printed onto a substrate.

3. The reconfigurable filter of claim 2, wherein the substrate comprises a circuit board.

4. The reconfigurable filter of claim 3, wherein the transmission line and the first and second filter stubs are etched in metal on the circuit board.

5. The reconfigurable filter of claim 4, wherein at least one of the first and second filter stubs is open circuited.

6. The reconfigurable filter of claim 4, wherein at least one of the first and second filter stubs is short circuited to ground.

7. The reconfigurable filter of claim 1, further comprising:

a) a third filter stub; and b) a third micro-electro-mechanical switch connected to the third filter stub and the transmission line for selectively coupling the third filter stub to the transmission line such that the third filter stub is electrically connected to the transmission line when the third micro-electro-mechanical switch is closed and electrically isolated from the transmission line when the third micro-electro-mechanical switch is open, wherein the third micro-electro-mechanical switch is opened and closed by a third voltage signal.

8. A reconfigurable filter comprising:

a) a transmission line;

b) a first filter stub electrically connected directly to the transmission line;

c) a second filter stub; and d) a micro-electro-mechanical switch electrically connected to the first filter stub and the second filter stub for selectively coupling the first filter stub to the second filter stub such that the first filter stub is electrically connected to the second filter stub when the micro-electro-mechanical switch is closed and the first filter stub is electrically isolated from the second filter stub when the micro-electro-mechanical switch is open, wherein the micro-electro-mechanical switch is opened and closed by a voltage signal.

9. The reconfigurable filter of claim 8, further comprising:

a) a third filter stub; and b) a second micro-electro-mechanical switch connected to the third filter stub and the transmission line for selectively coupling the third filter stub to the transmission line such that the third filter stub is electrically connected to the transmission line when the second micro-electro-mechanical switch is closed and electrically isolated from the transmission line when the second micro-electro-mechanical switch is open, wherein the second micro-electro-mechanical switch is opened and closed by a second voltage signal.

10. The reconfigurable filter of claim 8, further comprising:

a) a third filter stub; and b) a second micro-electro-mechanical switch connected to the second filter stub and the third filter stub for selectively coupling the second filter stub to the third filter stub such that the second filter stub is electrically connected to the third filter stub when the second micro-electro-mechanical switch is closed and electrically isolated from the third filter stub when the second micro-electro-mechanical switch is open, wherein the second micro-electro-mechanical switch is opened and closed by a second voltage signal.

11. A method of filtering a signal, comprising:

a) placing a signal on one end of a transmission line that is selectively coupled to a first filter stub by a first micro-electro-mechanical switch, wherein a second filter stub is selectively coupled to the first filter stub by a second micro-electro-mechanical switch, wherein the first and second micro-electro-mechanical switches are opened and closed by first and second voltage signals;

b) opening the first and second micro-electro-mechanical switches when a first filter configuration is desired;

c) closing the first and second micro-electro-mechanical switches when a second filter configuration is desired;

d) closing the first micro-electro-mechanical switch and opening the second micro-electro-mechanical switch when a third filter configuration is desired;

e) opening the first micro-electro-mechanical switch and closing the second micro-electro-mechanical switch when a fourth filter configuration is desired; and f) receiving the filtered signal at another end of the transmission line.

12. The method of claim 11, wherein the signal comprises millimeterwave frequencies.

13. The method of claim 12, wherein the transmission line and the first filter stub comprise printed metal lines on a circuit board.

14. The method of claim 12, wherein the transmission line, the first filter stub, and the second filter stub comprise printed metal lines on a circuit board.

* * * * *